April 7, 1953          H. S. GARRETT          2,633,818
BUOY INDICATOR
Filed Nov. 13, 1950          2 SHEETS—SHEET 1
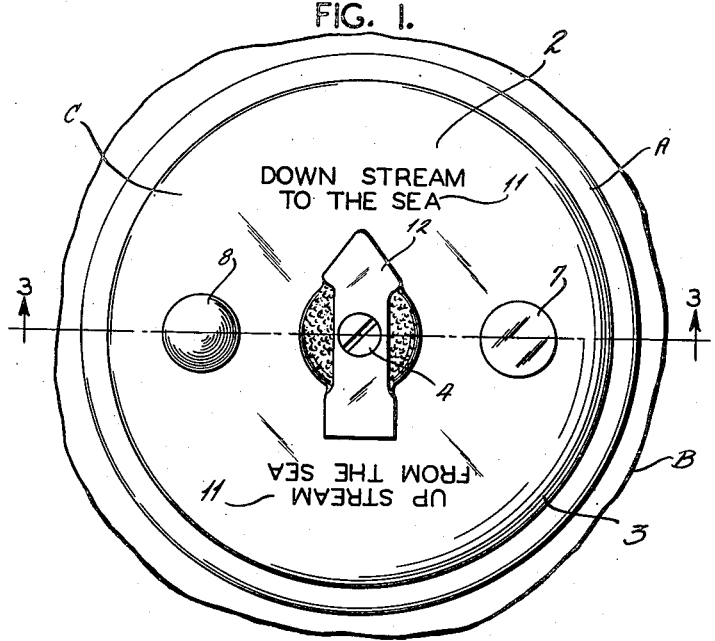
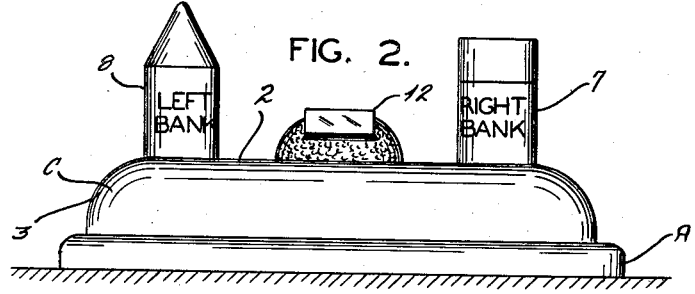
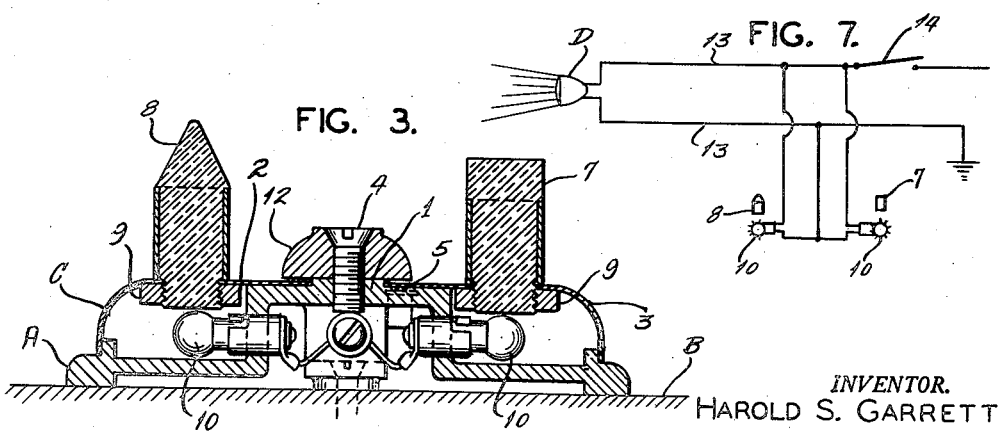
*INVENTOR.*
HAROLD S. GARRETT
BY
*Carr & Carr & Gravely*
ATTORNEYS.

April 7, 1953     H. S. GARRETT     2,633,818
BUOY INDICATOR
Filed Nov. 13, 1950     2 SHEETS—SHEET 2
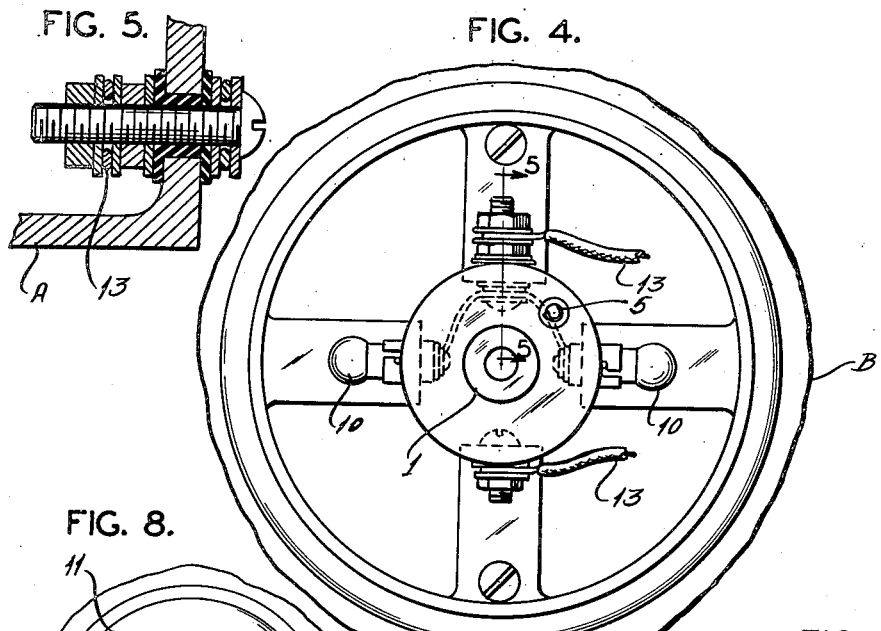
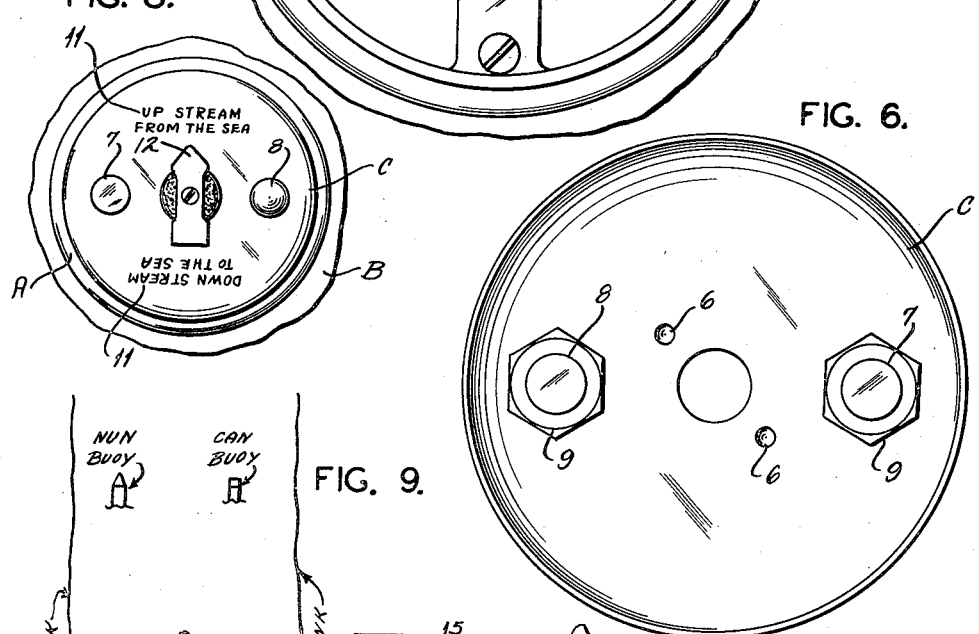
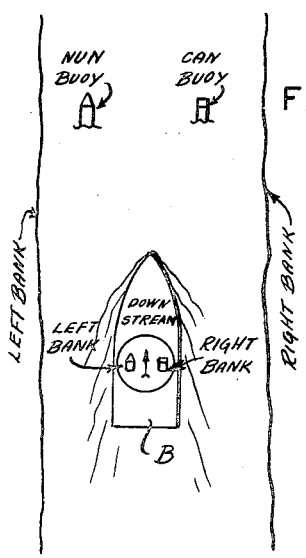
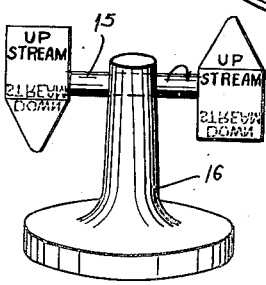
INVENTOR.
HAROLD S. GARRETT
BY
Carr & Carr & Gravely
ATTORNEYS.

Patented Apr. 7, 1953

2,633,818

UNITED STATES PATENT OFFICE 2,633,818

BUOY INDICATOR

Harold S. Garrett, Normandy, Mo., assignor to Normandy Machine Co. Inc., St. Louis, Mo., a corporation of Missouri Application November 13, 1950, Serial No. 195,422

3 Claims. (Cl. 116—26)

This invention relates to improvements in navigation instruments and is especially intended to aid in the operation of boats that travel through and along the various waterways of the country.

The invention has as its most important object to provide a device of the kind described that will promote the safety and the ease of waterway travel on inland and intercoastal waters which have their channels or paths for ship or boats marked by buoys, and especially where the buoys along one side of the channel are distinctly different in shape from the buoys placed along the opposite side of the channel.

Another object of my invention is to construct an indicator of the kind described that will have associated therewith a pair of miniatures or replicas of the buoys that are stationed along the respective sides of the channel of the river, and to provide said indicator with means for operatively actuating the same upon each reversal of travel of the boat so that the buoys may be moved into such a predetermined position as to be accurately correlated to the buoys on the channel.

An added object of the invention is to provide a device of the kind described, in which said replicas on the indicator are so made that they will conduct light and be illuminated from a source concealed therebelow, A further object of my invention is to provide an indicator of the kind described, so associated with the searchlight that is normally carried by such boats, that whenever the searchlight is operatively directed toward one side of the channel or the other at night when seeking out the buoys that are indicated on the charts as being substantially close at hand, the lighting means for the buoy replicas will be energized at the same time as the searchlight.

Other objects of this invention are to so construct a buoy indicator of the kind aforesaid, that will be neat and simple in construction and operation, of few parts, with practically nothing to get out of order or become damaged, be long lasting and attractive in appearance so as to harmonize with the furnishings and fixtures of the boat in which the same may be installed, and which will be otherwise satisfactory and efficient for the purpose wherever deemed applicable.

Many other objects and advantages of the construction herein shown and described will be obvious to those skilled in the art to which this invention appertains as will be more clearly apparent from the disclosures hereinafter given.

The invention also consists in the parts and in the arrangements and combinations of parts hereinafter described and claimed.

In the drawings accompanying, which form part of this specification and wherein like reference characters represent like or corresponding parts wherever they occur:

Fig. 1 is a top plan view of the device, as mounted in position,

Fig. 2 is a side elevational view thereof,

Fig. 3 is a vertical cross-sectional view, taken substantially along the line 3—3 of Fig. 1, Fig. 4 is a view similar to that shown in Fig. 1, but with the cover of the device removed in order to show other parts more clearly, Fig. 5 is a sectional detail, taken substantially along the line 5—5 of Fig. 4, Fig. 6 is a plan view of the cover, as viewed from its under side, Fig. 7 is a diagrammatic wiring view, showing the cooperation of the device, with the boat headlight, Fig. 8 is a plan view similar to that shown in Fig. 1, but with the boat travelling in a reverse direction, Fig. 9 is a view showing the relation of the buoy indicating device to the buoys placed along the channel through which the boat travels, and Fig. 10 is a perspective view of a modified form of this device.

Referring more particularly to the drawings, wherein I have illustrated a preferred embodiment of my invention, there is shown a buoy indicator adapted to be mounted in such a position on the boat as to be readily visible for consultation at all times by the person piloting or operating the boat.

It is the usual practice to consult charts or maps in the operation of a boat, in order to steer the latter through the proper channels of inland waterways and intercoastal waters, and I have provided an instrument that will make such consultation and buoy correlation easier and more accurate and greatly improve the resultant safety of boat operation when such charts are followed or referred to by the average boat operator.

These charts are generally made up by the governmental agencies that have jurisdiction and control of such waterways, and the buoys are indicated on the charts in accordance with terminology and standards of definition arbitrarily set up by such agencies. For instance, although one would ordinarily consider the right and left banks of the stream as being to his right and left respectively as the boat travels through the water, yet, as defined by said agencies and especially insofar as their map or chart making is concerned, the "right bank" is defined and marked as being that bank on the right of the boat as the boat travels downstream or toward the sea, while the "left bank" is the bank on the left of the boat as said boat travels downstream or toward the sea.

This terminology is confusing at times, especially to the average or amateur boat operator. For example, when the amateur boat operator is travelling upstream, the right bank referred to and noted on the government chart is actually to his left.

The right bank buoys are made of a predetermined shape or contour which is distinctly different and instantly distinguishable from the left bank buoys, and it is the customary practice in this country to have the right bank buoy shaped as a common cylinder which is often referred to as a "can" buoy, whereas the left bank buoys are shaped with a tapered or a conical top or cap and are referred to as a "nun" buoy.

The device embodying my invention is constructed so that a pair of miniatures or replicas of the buoys is mounted thereon. These buoys are clearly visible at all times and are movably adjustable together as a single unit so that said replicas may be oriented with the buoys in the stream. Thus, regardless of the direction of the craft, the indicator may be manipulated as a unit to position the replicas to correspond with the buoys that are on the banks.

A base member or support A is fixed to some supporting structure of the boat B, preferably at a point where the operator of the boat can easily observe it while performing his other duties, and in the example shown is in the form of a spider or plate having a central hub or disk portion 1.

A cover C is removably positioned on said base member, said cover preferably being in the shape of a cup with a central or main flat body portion 2 having a downwardly extending peripheral flange 3. This cover is frictionally seated on said disk portion 1 by any fastening means, such as a screw 4, and is rotatable with relation to said base member.

In order to prevent accidental rotational shifting of the cover, a pin and detent means may be secured to the opposed portions of the parts 1 and 2, as for example by a resiliently mounted pin 5 carried by the base member which projects upwardly above the part 1. The cover member is provided with a pair of recesses or detents 6 diametrically spaced apart at such a radius that they will be engageable by said pin 5.

A pair of buoy miniatures or replicas 7 and 8 are carried by said cover member and secured thereto by any suitable means, such as nuts 9, and project upwardly above the cover, said replicas being spaced diametrically or at 180 degrees apart, each of these replicas being of substantially identical shapes as one of the buoys that are positioned along one side of the channel.

One such replica, as for example the one indicated at 7, is made in the shape of a cylinder so as to correspond with the "can" buoys whereas the other replica 8 is provided with a tapered dome or cap to closely correspond with the "nun" buoys. These buoys are preferably made of a material that will conduct light therethrough from a source placed therebelow, and one material that has been found ideally adapted for the purpose is Lucite.

A pair of lights 10 is mounted on the base member in diametrically spaced relation and at such distance from the center of said member so that when one such light is in vertical registry with one of said buoy replicas, the other light will be in a corresponding position immediately below the other replica.

Some suitable marking or indicia 11 is preferably placed on the cover to indicate the direction in which the boat is travelling with relation to the flow of current of the waterway, as for example, these markings being at approximately 180 degrees apart, and arranged intermediate the pair of replicas.

A pointer 12 may be fixedly secured to the base member by the same screw that fastens the cover in place so that when the replicas are in one of their two operative positions, said pointer will be directed to the "upstream" marking 11 on the cover, and when the cover is rotated so that the replicas are in the reverse position the pointer will then point to the "downstream" travel of the boat.

In operation, the cover is frictionally held in position against accidental rotational displacement on the base member by said spring pressed pin and detent interlock. When the boat is travelling downstream, the pointer will indicate that direction of travel and the buoy replicas will be placed substantially at right angles to downstream travel, with the right bank buoy replica then positioned nearest that bank upon which the can buoys are to be found or are marked on the charts, while the left bank replica is placed so as to be nearest the other set of buoys. Hence, any reference to the charts will show the buoys and the replicas corresponding thereto as being on the same side of the boat, thereby making the following of the chart more easily performed by the average operator.

As soon as the boat is reversed in its travel, so as to advance upstream, the cover is then manually rotated through an angle of 180 degrees with respect to the base member, and the pointer will then indicate that the boat is traveling upstream, but it is to be noted that in this position too, the right bank buoy replica will be closest the buoys that are to be found toward that side of the boat, while the left bank replica will be closest to the other set of buoys, thereby obviating any confusion in the reading of the charts or reference thereto. The safety of operation with such ease of following the charts results naturally from the use of such an indicator.

It is not necessary that the replicas be constantly lighted during periods of darkness, as they are referred to only at intermittent periods. At night, the boat usually uses its searchlight D for picking out any objects desired, such as landmarks of any kind, and especially the buoys indicated on the charts. These searchlights are turned on or energized only when and where the buoys are expected to be encountered, to thereby check the position of the boat and the amount of its travel, and compare with the markings on the chart.

A pair of electrical conductors 13 is connected to the searchlight and lead to the pair of lights on the base member A through a control switch 14, so that when the switch for the searchlight is turned on and the searchlight is directed toward the point desired, said lights will then be energized and the replicas on the cover member will be lighted and, as soon as the searchlight is turned off, the lights beneath the replicas will be extinguished. The replicas are so mounted and so spaced on the cover that they will be lighted in only two predetermined positions of rotation of the cover, spaced 180 degrees apart, the pin and detent means acting to present accidental shifting of the cover from said set positions.

A modified form of this device is shown in Fig. 10 in which replica buoys are mounted on the opposite ends of a bar 15 which is rotatably mounted on a pedestal 16. With this form of the invention, the bar 15 is manually rotated 180 degrees about its longitudinal axis when the boat is reversed. A suitable cooperating pin and detent means may be used to prevent accidental shifting of the bar 15 from set positions, and the replicas may be provided with suitable illuminating means as in the principal form of the invention.

This invention is intended to cover all changes and modifications of the examples of the invention herein chosen for purposes of the disclosure, which do not constitute departures from the spirit and scope of the invention.

What I claim is:

1. A device of the type described for mounting on a boat; comprising a circular base member; a circular supporting member rotatably mounted on the base member; two different buoy replicas mounted on the supporting member in diametrically opposed relationship; detent means for releasably maintaining the supporting member in either of two selected rotated positions relative to the base member; an indicator mounted in fixed relationship relative to the base member; and indicia on the supporting member for cooperation with the indicator to indicate the selected direction of travel of the boat when the supporting member is in either of the two selected positions.

2. A device of the type described for mounting on a boat; comprising a circular base member; a circular supporting member rotatably mounted on the base member; two different buoy replicas mounted on the supporting member in diametrically opposed relationship; detent means for releasably maintaining the supporting member in either of two selected rotated positions relative to the base member; an indicator mounted in fixed relationship relative to the base member; indicia on the supporting member for cooperation with the indicator to indicate the selected direction of travel of the boat when the supporting member is in either of the two selected positions; and means for illuminating the buoy replicas only when the supporting member is in either of the two selected positions.

3. In combination; a boat; a base member fixedly mounted on the boat; a supporting member rotatably mounted on the base member; two different buoy replicas mounted on the supporting member in diametrically opposed relationship; and detent means for releasably maintaining the supporting member in either of two selected positions in which an imaginary line through the buoy replicas extends transversely of the longitudinal axis of the boat.

HAROLD S. GARRETT.

No references cited.